(12) United States Patent
Tateishi et al.

(10) Patent No.: US 10,113,045 B2
(45) Date of Patent: Oct. 30, 2018

(54) MOLDED FOAM ARTICLE, FOAMED SOLE, AND SHOE

(75) Inventors: Junichiro Tateishi, Kobe (JP); Kenichi Harano, Kobe (JP); Keisuke Yamada, Kobe (JP); Mitsuo Nasako, Kobe (JP)

(73) Assignee: ASICS CORPORATION (JP)

( * ) Notice: Subject to any disclaimer, the term of this patent is extended or adjusted under 35 U.S.C. 154(b) by 0 days.

(21) Appl. No.: 14/404,407

(22) PCT Filed: May 31, 2012

(86) PCT No.: PCT/JP2012/064153
§ 371 (c)(1),
(2), (4) Date: Jan. 15, 2015

(87) PCT Pub. No.: WO2013/179455
PCT Pub. Date: Dec. 5, 2013

(65) Prior Publication Data
US 2015/0143723 A1 May 28, 2015

(51) Int. Cl.
*C08J 9/10* (2006.01)
*A43B 13/04* (2006.01)
(Continued)

(52) U.S. Cl.
CPC .............. *C08J 9/103* (2013.01); *A43B 13/04* (2013.01); *A43B 13/187* (2013.01); *C08J 9/0004* (2013.01); *C08J 9/0014* (2013.01); *C08J 9/10* (2013.01); *C08J 2201/026* (2013.01); *C08J 2203/04* (2013.01); *C08J 2205/06* (2013.01); *C08J 2207/00* (2013.01); *C08J 2300/22* (2013.01); *C08J 2300/26* (2013.01);
(Continued)

(58) Field of Classification Search
CPC ........... C08J 9/10; C08J 9/103; C08J 2331/04
See application file for complete search history.

(56) References Cited

U.S. PATENT DOCUMENTS

2002/0144431 A1* 10/2002 Knoerr ................ A43B 7/14
36/31
2015/0181975 A1 7/2015 Otsuka et al.

FOREIGN PATENT DOCUMENTS

EP 2077283 A1 7/2009
JP 1998217270 A 8/1998
(Continued)

OTHER PUBLICATIONS

ASKER Durometer Type C, Device specification, Kobunshi Keiki Co., Ltd., http://www.asker.co.jp/en/products/durometer/analog/c/, Jun. 19, 2018.*
(Continued)

*Primary Examiner* — Victor S Chang
(74) *Attorney, Agent, or Firm* — Katten Muchin Rosenman LLP

(57) ABSTRACT

There is provided a molded foam article including a foam obtained by foaming a formation material wherein the formation material contains a resin component, an Asker C hardness of the foam is 10 degrees or more, and a ratio E40/E0 of the foam is 0.5 or more, the ratio E40/E0 being a ratio of an elastic coefficient E40 at a strain of 40% in relation to an elastic coefficient E0 at a strain of 0% of the foam.

The molded foam article has appropriate softness with a small change in hardness under compressive deformation.

9 Claims, 2 Drawing Sheets

(51) Int. Cl.
*C08J 9/00* (2006.01)
*A43B 13/18* (2006.01)

(52) U.S. Cl.
CPC ........ *C08J 2309/06* (2013.01); *C08J 2323/08* (2013.01); *C08J 2331/04* (2013.01); *C08J 2347/00* (2013.01); *C08J 2353/02* (2013.01)

(56) References Cited

FOREIGN PATENT DOCUMENTS

| | | |
|---|---|---|
| JP | 2005-205204 A | 8/2005 |
| JP | 2008308619 A | 12/2008 |
| JP | 2009-056007 A | 3/2009 |
| JP | 3167047 U | 3/2011 |
| JP | 2011-111566 A | 6/2011 |
| JP | 2012-504694 A | 2/2012 |
| WO | WO-2004090028 A1 | 10/2004 |
| WO | WO-2008013060 A1 | 1/2008 |
| WO | WO-2009/028564 A1 | 3/2009 |
| WO | WO-2013/179455 A1 | 12/2013 |

OTHER PUBLICATIONS

International Search Report issued in PCT/JP2012/064153 dated Aug. 7, 2012.
International Search Opinion in PCT/JP2012/064153.
Supplementary European Search Report dated Mar. 30, 2015 for the European patent application No. 12877672.
Supplementary European Search Report dated May 4, 2015 for the European patent application No. 12877672.

\* cited by examiner

MOLDED FOAM ARTICLE, FOAMED SOLE, AND SHOE

CROSS-REFERENCE TO RELATED APPLICATIONS

This patent application is a U.S. National Phase application under 37 U.S.C. § 371 of Patent Cooperation Treaty Application No. PCT/JP2012/064153, filed on May 31, 2012, entitled "Molded Foam Article, Foam Sole, And Shoe," the contents of which are incorporated herein by reference in entirety.

TECHNICAL FIELD

The present invention relates to a molded foam article and a sole for a shoe and a shoe using the molded foam article.

BACKGROUND ART

Various shoes such as sports shoes are provided with soles.

The soles can be roughly classified into a non-foamed sole made of a molded non-foamed article formed into a prescribed shape and a foamed sole made of a molded foam article formed into a prescribed shape.

A shoe provided with the foamed sole is lighter in weight than a shoe provided with the non-foamed sole, and is excellent in wearing impression.

Patent Document 1 discloses an ethylene copolymer consisting of only ethylene and an α-olefin having 3 to 20 carbon atoms, and having a vinyl-group content of 0.06 to 1, a MFR10/MFR2.16 of 8.5 or less, and a density of 0.850 to 0.910 g/cm$^3$. Furthermore, Patent Document 1 describes that a foamed sole obtained by foaming this ethylene copolymer has a low specific gravity and a low compression set.

Incidentally, the foamed sole is generally a member provided with a shoe for alleviating application of impact on a wearer in walking. Namely, the foamed sole can be said as a member responsible for wearing impression (wearing comfort of shoes in which the wearer feels). For the wearing impression, softness of the foamed sole becomes an important factor.

However, in the conventional foamed sole (molded foam article), when the compressive deformation amount is varied by various applied loads, softness may also greatly change. Namely, in the conventional foamed sole, the hardness greatly changes depending on various loads.

There is a problem that, when a shoe having the foamed sole described above is each worn by, for example, a general adult male and a child, the feeling of softness varies for each wearer.

[Patent Document 1] JP 2008-308619 (WO2008/152935)

SUMMARY OF THE INVENTION

The first object of the present invention is to provide a molded foam article having appropriate softness, with a small change in hardness under compressive deformation, and a foamed sole and a shoe using the same.

The second object of the present invention is to provide a relatively light molded foam article suitable as a member for a shoe, and a foamed sole and a shoe using the same.

The present inventors have considered that a molded foam article having a low compression set can maintain elastic force and has a small change in hardness, over a long period of time. While this consideration itself is not wrong, as the present inventors have studied various foamed soles, they have found that the feeling of softness varies for each wearer of a shoe.

Namely, even the foamed sole made of the molded foam article having a low compression set, sometimes, one wearer feels it soft, and other wearer feels it hard.

Specifically, one type of shoes having a foamed sole is usually industrially mass-produced, and distributed to the market. That one type of shoes is worn by various people. For example, a general adult male weighs more than a child.

According to the studies of the present inventors, for example, when a person with heavy weight wears shoes and takes exercise, the wearer tends to feel that the sole is soft. On the other hand, when a person with light weight wears shoes having the same foamed sole as the shoes worn by the person with heavy weight, the wearer tends to feel that the sole is hard.

The present inventors have intensively studied about the cause of the above, and it is considered attributable to that the elastic coefficient of the foamed sole when compressively deformed (for example, when a general adult male and a child actually wear the shoes, and the like) is not uniform.

FIG. 4 is a graph figure showing a stress-strain curve of a conventional foamed sole (midsole used in a shoe of trade name "SORTIE@JAPAN LYTE" manufactured by ASICS Corporation). The elastic coefficient is obtained from $E=\Delta\sigma/\Delta\varepsilon$.

As apparent from FIG. 4, in a conventional foamed sole, when the strain is small like 0% to 5%, the elastic coefficient is large, and when the strain is large like 40% to 45%, the elastic coefficient is small. Based on the above, when the strain is small, the conventional foamed sole becomes hard (the elastic coefficient becomes large), and when the strain is large, the conventional foamed sole becomes soft comparing with that (the elastic coefficient becomes small). When a person with light weight wears a foamed sole, a relatively small load is applied to the foamed sole (the strain is small). When a person with heavy weight wears a foamed sole, a relatively large load is applied to the foamed sole (the strain is large).

Large change of the elastic coefficient of the foamed sole depending on the strain amount and the wearing impression of shoes corresponding to the situation of the wearer are correlated. The points described above are matters found by the present inventors for the first time.

The present inventors have obtained the knowledge described above, thereby completing the present invention.

The molded foam article according to the present invention has a foam obtained by foaming a formation material containing a resin component, and an Asker C hardness of the foam is 10 degrees or more and a ratio (E40/E0) is 0.5 or more, the ratio (E40/E0) being a ratio of an elastic coefficient (E40) at a strain of 40% in relation to the elastic coefficient (E0) at a strain of 0% of the foam.

Here, the E0 is the elastic coefficient of the foam at a strain of 0%, and the E40 is the elastic coefficient of the foam at a strain of 40%. The ratio E40/E0 is obtained by dividing E40 by E0.

The molded foam article has a foam (foams) having an Asker C hardness of 10 degrees or more and the ratio (E40/E0) of 0.5 or more. The molded foam article described above has appropriate softness, and its change in hardness under various compressive deformation is small.

According to the shoe provided with the molded foam article described above as a foamed sole, variation in the feeling of softness of the wearers wearing the shoes hardly occurs.

In a preferred molded foam article according to the present invention, the Asker C hardness of the foam is 60 degrees or less.

In a further preferred molded foam article according to the present invention, the formation material has a storage modulus at a frequency of 10 Hz at 23° C. of 15 MPa or less.

In a further preferred molded foam article according to the present invention, the foam has a specific gravity of 0.7 or less.

According to another aspect of the present invention, a foamed sole is provided.

The foamed sole according to the present invention is provided with any one of the foregoing molded foam article.

According to another aspect of the present invention, a shoe is provided.

The shoe is provided with the foamed sole.

The molded foam article of the present invention has appropriate softness, and further, the change in hardness under compressive deformation is small.

When the molded foam article is used, for example, as a foamed sole, comfortable wearing impression can be provided to various wearers.

DESCRIPTION OF EMBODIMENTS

Figure 1:
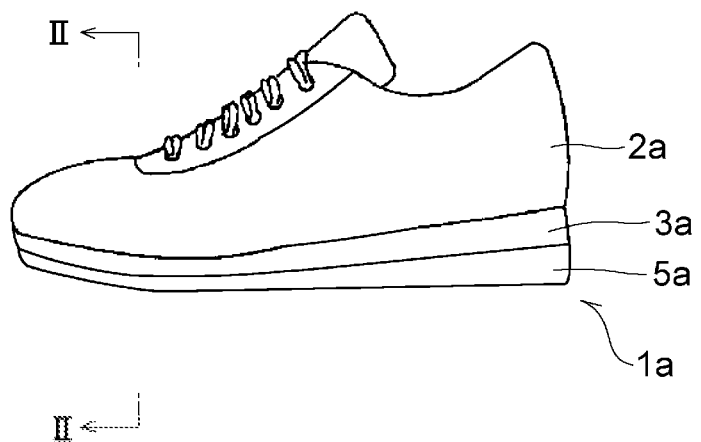
FIG. 1 is a side view illustrating a first embodiment of the shoe according to the present invention.

The molded foam article of the present invention has a foam including a formation material containing a resin component, and an Asker C hardness of the foam is 10 degrees or more and a ratio (E40/E0) of the elastic coefficient (E40) at a strain of 40% in relation to the elastic coefficient (E0) at a strain of 0% of the foam is 0.5 or more.

According to the present invention, a shoe excellent in wearing impression can be provided.

Hereinafter, a foam molded article, a foamed sole, and a shoe according to the present invention are specifically described.

In the present specification, the wording "XXX to YYY" means that "XXX or more and YYY or less".

In the present specification, the elastic coefficient at a strain of 0%, the elastic coefficient at a strain of 40%, and a ratio of the elastic coefficient at a strain of 40% in relation to the elastic coefficient at a strain of 0% may be sometimes simply referred to as "E0", "E40", and "E40/E0", respectively.

[Use of Molded Foam Article of Present Invention]

The molded foam article of the present invention can be used for any use.

Examples of the use of the molded foam article of the present invention include constituting members of a shoe such as a sole; constituting members of sporting goods such as a grip of a striking tool such as a tennis racket, a supporter and a protector; and the like.

The molded foam article of the present invention is preferably used as a constituting member of a shoe. Examples of the constituting member of a shoe include soles such as outsole, midsole, and insole; a shoe body such as upper; reinforced members such as shank; and the like.

In addition, the molded foam article of the present invention may be a part of the constituting member of a shoe. In this case, it is preferred to use the molded foam article in a shoe part to which a large load is applied since the wearing comfort can be controlled. For example, the molded foam article is suitably used in the forefoot portion (the portion just under hallux ball) of the sole, the heel portion of the sole, and the like. Furthermore, the molded foam article can be also used in combination with other materials. For example, the molded foam article is suitably used as a laminated structure with other materials (one or more layers of molded foam articles are contained in the structure).

The molded foam article according to the present invention is used as a foamed sole.

For example, the foamed sole according to the present invention is used as an outer sole of a shoe, and is disposed on the lower surface of a shoe body. Moreover, the foamed sole according to the present invention is used as a midsole of a shoe, and is disposed between a shoe body and an outer sole, for example.

The foamed sole according to the present invention can be disposed on the whole lower surface of a shoe body. Moreover, the foamed sole may be disposed on a part of the lower surface of a shoe body.

Moreover, the foamed sole according to the present invention can be used not only as an outer sole and a midsole described above but also as a reinforcing member such as a shank member of a shoe. The shank member is a bottom member which is disposed to a plantar arch part.

The foamed sole is formed into an arbitrary shape. For example, the foamed sole is formed into a substantially plate-like shape, a substantially convex shape (e.g. a truncated cone-like shape, etc.), a plate-like shape on which a concave-convex shape is formed, or the like. The foamed sole according to the present invention is obtained by forming a molded foam article into a prescribed shape according to the use thereof as a midsole, an outer sole, a shank member, or the like described above.

For example, the foamed sole can be fixedly disposed to a shoe body with an attachment method such as an adhesive.

The adhesive is not particularly limited, and examples thereof include a conventionally known solvent-type adhesive, an emulsion-type adhesive, a laser adhesive, and a heat-sensitive adhesive. The solvent-type adhesive is an adhesive prepared by dissolving or dispersing a binder resin in an organic solvent, and the emulsion-type adhesive is an adhesive prepared by dispersing a binder resin in water. The laser adhesive is an adhesive which exhibits adhesive properties by being irradiated with laser light. The heat-sensitive adhesive is an adhesive which exhibits adhesive properties by being heated.

It is not limited to the case of attaching the foamed sole to the shoe body using an attaching means. For example, a part of the foamed sole may be laser-melted to exhibit adhesion, and the foamed sole may be attached to the shoe body by the adhesion of the foamed sole itself.

Furthermore, it is not limited to the case of fixedly attaching the foamed sole. For example, the foamed sole may be formed to a prescribed shape and fitted in the shoe body, thereby being removably attached to the shoe body.

[Configuration and Use of Shoe According to Present Invention]

Figure 2:
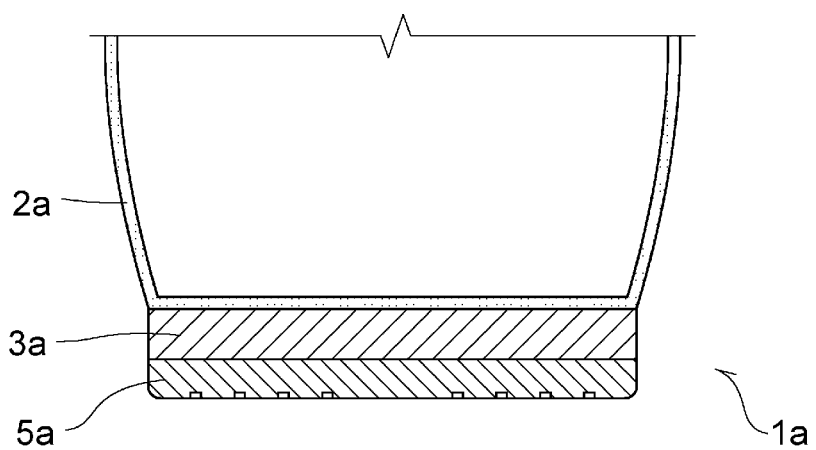
FIG. 2 is an enlarged II-II line sectional view of FIG. 1 and an enlarged sectional view omitting the upper part of the shoe body.

FIGS. 1 and 2 illustrate a first embodiment of a shoe according to the present invention.

This shoe 1a is provided with a shoe body 2a, a midsole 3a disposed on the lower surface of the shoe body 2a, and an outer sole 5a disposed on the lower surface of the midsole 3a. The midsole 3a is formed into a shape which is almost the same as that of the lower surface of the shoe body 2a, and the outer sole 5a is formed into a shape which is almost the same as that of the lower surface of the midsole 3a. As illustrated in FIG. 2, a desired concave-convex shape is formed on the lower surface of the outer sole 5a. Of course, the lower surface of the outer sole 5a may be formed into a flat shape (not illustrated).

The upper surface of the midsole 3a is adhered to the lower surface of the shoe body 2a with an adhesive, and the upper surface of the outer sole 5a is adhered to the lower surface of the midsole 3a with an adhesive (the adhesive is not illustrated). At the time of using the shoe 1a, the lower surface of the outer sole 5a makes contact with the ground.

The foamed sole according to the present invention is used as the outer sole 5a of the shoe 1a. Alternatively, the foamed sole according to the present invention is used as the midsole 3a of the shoe 1a. Alternatively, the foamed soles according to the present invention each are used as the midsole 3a and the outer sole 5a of the shoe 1a.

Figure 3:
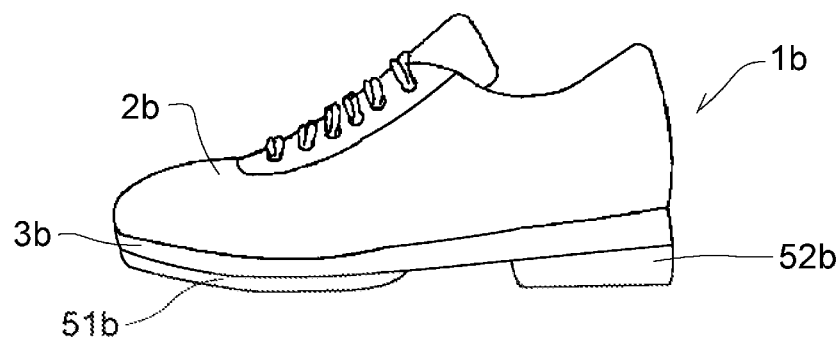
FIG. 3 is a side view illustrating a second embodiment of the shoe according to the present invention.

FIG. 3 illustrates a second embodiment of a shoe according to the present invention.

This shoe 1b is provided with a shoe body 2b, a midsole 3b disposed on the lower surface of the shoe body 2b, a first outer sole 51b disposed at the front side of the lower surface of the midsole 3b, and a second outer sole 52b disposed at the rear side of the lower surface of the midsole 3b. The midsole 3b is formed into a shape which is almost the same as that of the lower surface of the shoe body 2b, and each of the first outer sole 51b and the second outer sole 52b is formed into a shape which is smaller than that of the lower surface of the midsole 3b.

The upper surface of the midsole 3b is adhered to the lower surface of the shoe body 2b with an adhesive, and the upper surfaces of the first and second outer soles 51b, 52b each are adhered to the lower surface of the midsole 3b with an adhesive (the adhesive is not illustrated). At the time of using the shoe 1b, the lower surfaces of the first and second outer soles 51b, 52b each make contact with the ground, and a part of the lower surface of the midsole 3b may make contact with the ground.

The foamed sole according to the present invention is used as the first outer sole 51b and/or the second outer sole 52b of the shoe 1b. Alternatively, the foamed sole according to the present invention is used as the midsole 3b of the shoe 1b. Alternatively, the foamed soles according to the present invention each are used as the midsole 3b and the first and second outer soles 51b, 52b of the shoe 1b.

Each of the thicknesses of the midsoles 3a and 3b is not particularly limited. In order to impart the shoe with appropriate cushioning properties, each of the thicknesses of the midsoles 3a and 3b is, for example, 2 mm or more, preferably 2 mm to 10 mm.

Each of the thicknesses of the outer sole 5a, the first outer sole 51b, and the second outer sole 52b is not particularly limited. In order to impart the shoe with appropriate cushioning properties, each of the thicknesses of the outer sole 5a, the first outer sole 51b, and the second outer sole 52b is, for example, 2 mm or more, preferably 2 mm to 20 mm.

In this connection, the shoe according to the present invention may have not only a structure in which the shoe body protects almost the whole instep, as illustrated, but also such a structure in which a shoe body protects a part of the instep (e.g. a sandal, etc.).

The use of the shoe according to the present invention is not particularly limited. For example, the shoe according to the present invention can be used as shoes for various ball games such as soccer shoes and rugby shoes; shoes for running such as jogging shoes and marathon shoes; shoes for track and field events; a broad class of sports shoes; shoes for walking; beach sandals, and the like.

According to the present invention, it is possible to provide a foamed sole which has a relatively low specific gravity (that is, a foamed sole which is light in weight). The shoe according to the present invention which is provided with the foamed sole is satisfactory as shoes for ball games, shoes for running, shoes for track and field events, or shoes for walking.

[Characteristics of Molded Foam Article (Foamed Sole)]

The molded foam article of the present invention is obtained by forming a foam obtained by foaming a formation material containing a resin component, to a prescribed shape.

The foam has an Asker C hardness of 10 degrees or more and a ratio (E40/E0) of the elastic coefficient (E40) at a strain of 40% in relation to the elastic coefficient (E0) at a strain of 0% of 0.5 or more.

The foam preferably has an Asker C hardness of 60 degrees or less. Furthermore, the foam has a specific gravity of 0.7 or less.

In addition, the formation material containing the resin component has a storage modulus at a frequency of 10 Hz at 23° C. of 15 MPa or less.

The elastic coefficients (E0) and (E40) can be calculated from the stress-strain curve of the foam. The stress-strain curve of the foam can be obtained by compressing a sample piece obtained by forming a foam to be measured into a columnar shape of 10 mm in diameter×10 mm in height, at a strain rate of 0.01 mm/second.

The Asker C hardness can be measured at 23° C., in accordance with JIS K 7312.

The specific gravity can be measured at 23° C., in accordance with JIS K 7311.

The storage modulus at a frequency of 10 Hz at 23° C. can be measured, in accordance with JIS K 7244-4.

The following examples are shown as a reference for specific measurement methods.

A storage modulus of the formation material at a frequency of 10 Hz at 23° C. is preferably 13 MPa or less, more preferably 10 MPa or less. A molded foam article having excellent softness can be obtained by foaming the formation material having such the storage modulus described above.

The lower limit of the storage modulus of the formation material is theoretically zero. However, the storage modulus practically exceeds 0. A formation material practically available in the market is those having a storage modulus of, for example, 0.01 MPa or more.

The foam according to the present invention has a ratio of the elastic coefficient (E40/E0) of 0.5 or more, preferably has a ratio of the elastic coefficient (E40/E0) of 0.5 to 3.5, more preferably has the aforementioned ratio of 0.5 to 3.0, particularly preferably has the aforementioned ratio of 0.5 to 2.7.

A strain of 0% corresponds to the initial strain amount of compressive deformation. A strain of 40% corresponds to the strain amount of compressive deformation, assumed at the actual use. The ratio of elastic coefficients (E40/E0) indicates a change of the initial elastic coefficient and the elastic coefficient at the actual use.

The foam has an Asker C hardness of 10 degrees or more, preferably has an Asker C hardness of 10 degrees to 60 degrees, more preferably has an Asker C hardness of 15 degrees to 60 degrees, and particularly preferably has an Asker C hardness of 20 degrees to 50 degrees, at no load.

The foam has an Asker C hardness of 10 degrees or more, thus has appropriate softness (is not too soft). In particular, the foam having an Asker C hardness of 10 degrees to 60 degrees has appropriate softness as a foamed sole of a shoe.

The foam having an Asker C hardness of 10 degrees or more and a ratio of elastic coefficients (E40/E0) of 0.5 or more has appropriate softness, and the variation of softness at use thereof is small. When the foam is used as a foamed sole, a shoe that can provide comfortable wearing impression to a wearer can be provided.

The characteristics of the present invention are specifically described as follows.

Theoretically, a foam having a constant elastic coefficient corresponding to every strain amounts can be said to have no change in hardness (change in softness).

Figure 4:
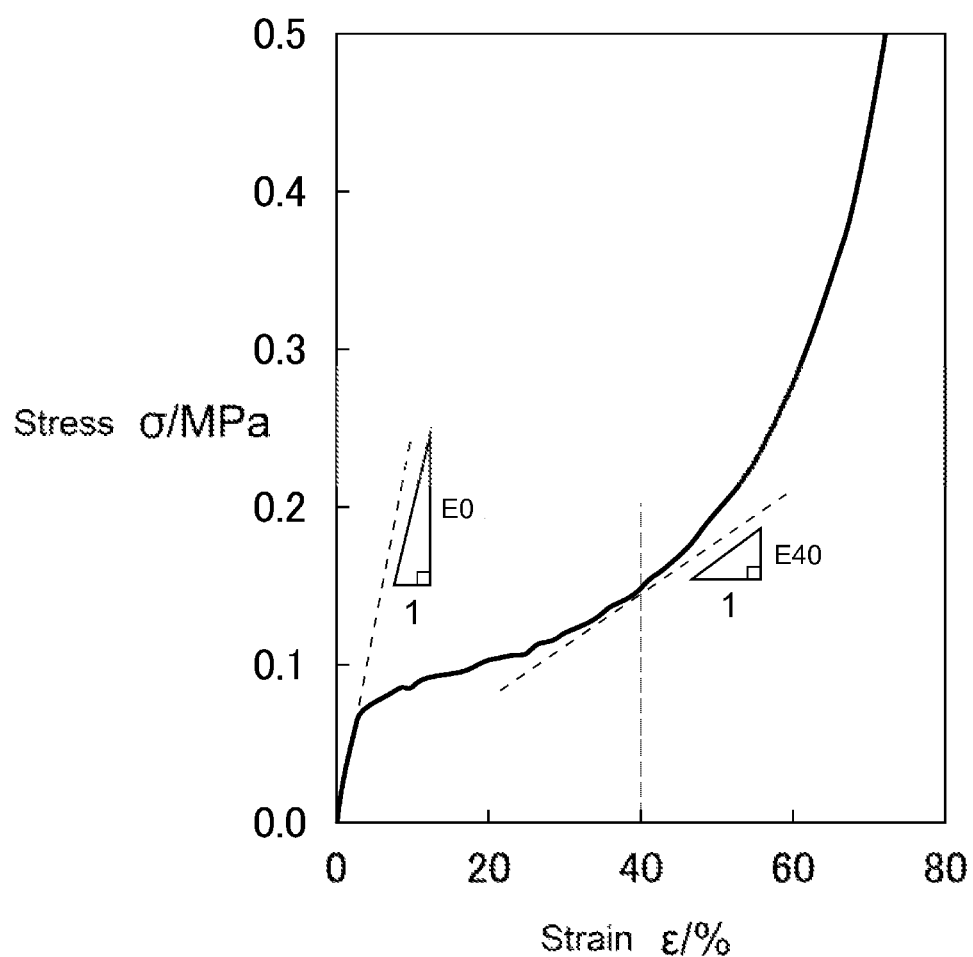
FIG. 4 is a graph figure showing a stress-strain curve of a conventional foamed sole.

However, a general foam shows a stress-strain curve, as illustrated in FIG. 4, and the elastic coefficient variously changes depending on the strain amount.

Even it is theoretically possible, a foam having a constant elastic coefficient corresponding to every strain amounts cannot be practically produced.

Under the above consideration, the present inventors have focused on the elastic coefficient (E0) corresponding to the strain amount at no load and the elastic coefficient (E40) corresponding to the strain amount when a large load assumed at use is applied.

On the other hand, it is also important that the change in hardness of a foam does not decrease only by the ratio of elastic coefficients. This is because numerous bubbles (cells) exist inside the foam, and the cells are deformed when a load is applied to the foam. The foam with their cells deformed would lose its elasticity, and the hardness would increase.

Based on the matters described above, the present inventors have found that the foam has a E40/E0 of 0.5 or more and an Asker C hardness at no load of 10 degrees or more, whereby the change in hardness would not be large at use.

Furthermore, a foam having an Asker C hardness at no load of 60 degrees or less can constitute a foam having appropriate softness and small change in hardness. The molded foam article having the aforementioned foam can be suitably used as a sole of a shoe.

[Formation Material of Molded Foam Article]

The molded foam article of the present invention (foamed sole) is obtained by foam-molding the formation material containing the resin component.

The formation material of the molded foam article of the present invention is not particularly limited as long as it contains the resin component and has foamability. Preferably, the storage modulus of the formation material is 15 MPa or less. When the storage modulus of the formation material is 15 MPa or less, a ratio of elastic coefficients of the foam (E40/E0) is easily controlled at 0.5 or more.

The formation material contains a resin component and any other appropriate components as necessary.

Examples of the resin component include a thermoplastic elastomer, a thermoplastic resin, a rubber and the like.

Examples of the kind of the thermoplastic elastomer include a styrene-based elastomer such as a styrene-ethylene-butylene-styrene block copolymer (SEBS); an ethylene-vinyl acetate copolymer-based elastomer; an olefin-based elastomer; a styrene-butadiene-styrene copolymer (SBS), an urethane-based elastomer; an ester-based elastomer; a fluorine-based elastomer; a silicone-based elastomer; and a polyamide-based elastomer. A thermoplastic elastomer in which an arbitrary part thereof is hydrogenated may be used. These thermoplastic elastomers may be used alone or in combination of two or more thereof.

Examples of the kind of the thermoplastic resin include vinyl acetate-based resins such as an ethylene-vinyl acetate copolymer (EVA); styrene-based resins such as polystyrene, a styrene-butadiene resin, an acrylonitrile-styrene resin (an AS resin), and an acrylonitrile-butadiene-styrene resin (an ABS resin); olefin-based resins such as low density polyethylene, high density polyethylene, and polypropylene; α-olefin-based resins such as an ethylene-α-olefin copolymer and an ethylene-butene copolymer; ester-based resins such as polyethylene terephthalate and polybutylene terephthalate; amide-based resins such as 6-nylon; vinyl chloride-based resins; acrylic resins such as polymethyl methacrylate. The thermoplastic resins in which an arbitrary part thereof is hydrogenated may be used. These thermoplastic resins may be used alone or in combination of two or more thereof.

Examples of the kind of the rubber include synthetic rubbers such as a butadiene rubber (BR), an isoprene rubber (IR), and a chloroprene rubber (CR); natural rubbers (NR); and copolymer rubbers such as a styrene-butadiene rubber (SBR), an acrylonitrile-butadiene rubber (NBR), and a butyl rubber (IIR). These rubbers may be used alone or in combination of two or more thereof.

When the amount of the resin component blended is, for example, 30 parts by mass to 99 parts by mass, preferably 50 parts by mass to 99 parts by mass, based on 100 parts by mass of the total weight of the formation material. When the amount of the resin component is too small, a molded foam article having a strength durable for practical use may not be obtained.

As necessary, a softener can be added to the resin component. When a formation material having a storage modulus of 15 MPa or less cannot be obtained only by the resin component, a softener is added to the resin component, whereby a formation material having the storage modulus described above can be easily prepared.

The softener is not particularly limited, and a conventionally known softener for a resin or rubber can be used. Examples of the softener include mineral oils such as naphthene-based process oils and paraffin-based process oils; vegetable oils such as castor oil, cottonseed oil, linseed oil, rapeseed oil, soybean oil, palm oil, coconut oil, peanut oil, tallow, pine oil, and olive oil; and the like. These softeners can be used alone, or two or more softeners can be used in combination.

It is preferred that these mineral oils and vegetable oils have an average molecular weight of about 500 to 5,000.

When the softener is added, the amount of the softener is not particularly limited, and for example, it is more than 0 and less than 70 parts by mass, preferably more than 0 and less than 50 parts by mass, based on 100 parts by mass of the total weight of the formation material. When the amount of the softener is too large, the softener may bleed, and also the amount of the resin component relatively decreases, thus a molded foam article having a strength durable for practical use may not be obtained.

As other components of the formation material, a foaming agent, a foaming auxiliary, a crosslinking agent, and various other additives may be added. A molded foam article having appropriate softness and excellent mechanical strength can be obtained by crosslinking resin component with the crosslinking agent.

The method for obtaining the molded foam article of the present invention is not particularly limited, and a known method can be used. Among them, an extrusion foaming method, a press foaming method or an injection foaming method is preferably used, since a molded foam article having high mechanical strength can be formed. When these methods are adopted, a molded article may be compressed by hot pressing or the like, so as to have a prescribed specific gravity after foaming, as necessary.

There are chemical methods, physical methods and the like for foaming. When producing by each method described above, a foaming agent such as a chemical foaming agent such as an inorganic foaming agent or organic foaming agent, and a physical foaming agent is added to a formation material, whereby a molded article in which bubbles are distributed inside the material can be obtained.

Examples of inorganic foaming agents include sodium carbonate, sodium bicarbonate, ammonium carbonate, ammonium bicarbonate, ammonium nitrite, azide compounds, borohydride sodium, and metallic powder.

The organic foaming agent includes azodicarbonamide (ADCA), azobisformamide, azobisisobutyronitrile, barium azodicarboxylate, N,N'-dinitrosopentamethylenetetramine (DNPT), N,N'-dinitroso-N,N'-dimethylterephthalamide, benzenesulfonylhydrazide, p-toluenesulfonylhydrazide, p,p'-oxybisbenzenesulfonylhydrazide (OBSH), p-toluenesulfonylsemicarbazide, and the like.

Examples of physical foaming agents include carbon hydride such as pentane, butane, and hexane; halogenated hydrocarbon such as methyl chloride and methylene chloride; gas such as nitrogen and air; fluorinated hydrocarbon such as trichlorofluoromethane, dichlorodifluoromethane, trichlorotrifluoroethane, chlorodifluoroethane, and hydrofluorocarbon. These foaming agents can be used alone or in combination of two or more thereof.

In addition, when a molded foam article is produced by a physical method, a hollow filler and a thermal expansion micro balloon appropriate for a formation material of the molded article and the like may be contained, or the formation material may be gas-kneaded.

In order to promote foaming, a foaming auxiliary may be used together with the foaming agent. The foaming auxiliary includes urea, urea derivatives, and the like.

The amount of the foaming agent blended is not particularly limited and is appropriately designed. For example, the amount of the foaming agent blended is 0.1 parts by mass to 10 parts by mass based on 100 parts by mass of the total weight of the formation material.

The crosslinking agent is not particularly limited, and a conventionally known crosslinking agent can be used. Examples of the crosslinking agent include organic peroxides; sulfur; compounds which generate sulfur by heating such as disulfides; metal oxides such as magnesium oxide; and the like. Preferably, an organic peroxide is used.

Examples of the organic peroxide include dialkyl peroxides such as 2,5-dimethyl-2,5-di(t-butylperoxy)hexane, dicumyl peroxide, 1,3-bis(t-butylperoxyisopropyl)benzene, 2,5-dimethyl-2,5-di(t-butylperoxy)hexyne-3, and t-butyl-cumylperoxide; peroxyketals such as 1,1-di-t-butylperoxy-3,3,5-trimethylcyclohexane, and 4,4-di-t-butylperoxyvaleric acid-n-butyl ester; diacyl peroxides such as benzoyl peroxide; and the like.

Furthermore, in order to accelerate the crosslinking, a known crosslinking accelerator may be used together with the crosslinking agent.

The amount of a crosslinking agent blended is not particularly limited and is appropriately designed. For example, the amount of the crosslinking agent blended is 0.1 parts by mass to 5 parts by mass based on 100 parts by mass of the total weight of the formation material.

Examples of the additive include a heat stabilizer, a light stabilizer, an antioxidant, an ultraviolet ray absorber, a coloring agent, a plasticizer, an antistatic agent, a thickening agent, a bulking agent, and stearic acid.

[Production of Molded Foam Article (Foamed Sole)]

A forming material containing the resin component is foam-molded.

Specifically, prescribed amounts of the resin component and other components including the softener, the foaming agent, the crosslinking agent, and the additives which are added as necessary are blended, and this is kneaded with a mixing roller, a pressurizing kneader, an extruder, or the like while being heated to 100° C. to 150° C.

The forming material thoroughly kneaded is charged into a press mold, and for example, the forming material is pressed for a prescribed time while being heated to 150° C. to 170° C. to cross-link the resin component and allow the foaming agent to foam.

Although the foaming ratio is not particularly limited, the ratio is, for example, 1.2 times to 10 times, preferably 1.5 times to 7 times.

The foaming ratio can be obtained by the formula;

Foaming Ratio=Density Before Foaming of Formation Material/Density after Foaming of Formation Material A foam is obtained by foaming the formation material. An Asker C hardness of the obtained foam is preferably 60 degrees or less, more preferably 55 or less. The molded foam article having the hardness described above is soft and is excellent in wearing impression.

From the viewpoint of weight reduction, a specific gravity of the foam is preferably 0.7 or less, more preferably 0.6 or less, further preferably 0.55 or less. Furthermore, the lower limit of the specific gravity of the foam is preferably as low as possible, but the specific gravity of the foam exceeds 0 theoretically. In general, the specific gravity of the foam is 0.1 or more, preferably 0.2 or more.

A foam as described above may be used directly as the molded foam article of the present invention, or the foam may be molded to a desired shape and used directly as the molded foam article of the present invention.

Secondary processing is performed so that the shape of the molded foam article of the present invention is adapted to a shape of an outer sole, and thus, the foamed sole according to the present invention can be obtained.

Moreover, in the case where the shape of the molded foam article is formed in a shape of a foamed sole (in the case where the shape of the mold is formed in a shape of an outer sole, for example), the molded foam article obtained can be used directly as the foamed sole of the present invention.

The foamed sole obtained is adhered to a shoe body with an adhesive.

In the case where a solvent-type adhesive or an emulsion-type adhesive is used as the adhesive, for example, the adhesive is exposed to hot air of 60° C. to 80° C. to dry. In the case where a laser adhesive or a heat-sensitive adhesive is used as the adhesive, the foamed sole is adhered to a shoe body with the adhesive in a state of being melted by heating with a laser or a heating apparatus.

In addition, the foamed sole can be also used as a detachable member for a shoe, not only when attached to a shoe body and used. For example, using the foamed sole as an insole of a shoe, this foamed sole may be fitted in the shoe body.

The shoe of the present invention can be obtained as described above.

EXAMPLES

Hereinafter, the present invention will be described in more detail with reference to Examples and Comparative Examples. However, the present invention is not limited to the following Examples.

[Materials Used in Examples and Comparative Examples]

SBBS: Styrene-butadiene-butylene-styrene copolymer elastomer (manufactured by Asahi Kasei Chemicals Corporation, trade name "Tuftec MP10") Styrene amount of 30% by mass, Butadiene and butylene amount of 70% by mass EVA: Ethylene-vinyl acetate copolymer (manufactured by TOSOH CORPORATION, trade name "Ultracene 634") MFR=4.3

Mineral oil: Paraffin oil (manufactured by Idemitsu Kosan Co., Ltd., trade name "PW90")

Processing aid: Stearic acid

Foaming agent: Azodicarbonamide

Foaming auxiliary: Zinc oxide

Crosslinking agent: Dicumyl peroxide

Example 1

A resin component, a mineral oil, a processing aid, a foaming agent, a foaming auxiliary, and a crosslinking agent were blended in the proportion listed in Table 1. These materials were kneaded using a pressurizing kneader and a mixing roller, the mixture was charged into a press mold, and the mixture was pressed for a prescribed time while being heated to 160° C. to prepare a foam having a rectangular parallelepiped shape of 200 mm in longitudinal length by 200 mm in lateral length by 10 mm in height.

In this context, unit for each of the numerical values in Table 1 is part by mass.

TABLE 1

| | SBBS | EVA | Mineral Oil | Foaming Agent | Foaming Auxiliary | Processing Aid | Crosslinking Agent |
|---|---|---|---|---|---|---|---|
| Example 1 | 83 | — | 17 | 0.5 | 1 | 0.5 | 1.5 |
| Example 2 | 83 | — | 17 | 1 | 1 | 0.5 | 1.5 |
| Example 3 | 83 | — | 17 | 3 | 1 | 0.5 | 1 |
| Example 4 | 83 | — | 17 | 4 | 1 | 0.5 | 1 |
| Example 5 | 71 | — | 29 | 0.5 | 1 | 0.5 | 1.5 |
| Example 6 | 71 | — | 29 | 1 | 1 | 0.5 | 1.5 |
| Example 7 | 71 | — | 29 | 2 | 1 | 0.5 | 1.5 |
| Example 8 | 71 | — | 29 | 4 | 1 | 0.5 | 1 |
| Example 9 | 53 | — | 47 | 0.25 | 1 | 0.5 | 1 |
| Example 10 | 53 | — | 47 | 0.5 | 1 | 0.5 | 1 |
| Example 11 | 38 | — | 62 | 0.25 | 1 | 0.5 | 1 |
| Example 12 | 38 | — | 62 | 0.5 | 1 | 0.5 | 1 |
| Example 13 | — | 100 | — | 1 | 1 | 0.5 | 0.6 |
| Example 14 | — | 82 | 18 | 0.5 | 1 | 0.5 | 1 |
| Example 15 | — | 82 | 18 | 1 | 1 | 0.5 | 1 |
| Example 16 | — | 82 | 18 | 2 | 1 | 0.5 | 1 |
| Example 17 | — | 69 | 31 | 0.5 | 1 | 0.5 | 1 |
| Example 18 | — | 69 | 31 | 1 | 1 | 0.5 | 1 |
| Example 19 | — | 69 | 31 | 2 | 1 | 0.5 | 1 |
| Comparative Example 1 | 100 | — | — | 2 | 1 | 0.5 | 1 |
| Comparative Example 2 | 100 | — | — | 3 | 1 | 0.5 | 1 |
| Comparative Example 3 | 100 | — | — | 4 | 1 | 0.5 | 1 |
| Comparative Example 4 | 53 | — | 47 | 1 | 1 | 0.5 | 1 |
| Comparative Example 5 | 53 | — | 47 | 2 | 1 | 0.5 | 1 |
| Comparative Example 6 | 38 | — | 62 | 1 | 1 | 0.5 | 1 |
| Comparative Example 7 | 38 | — | 62 | 2 | 1 | 0.5 | 1 |
| Comparative Example 8 | — | 100 | — | 2 | 1 | 0.5 | 0.6 |
| Comparative Example 9 | — | 100 | — | 3 | 1 | 0.5 | 0.6 |

Examples 2 to 19

A foam was prepared in the same method as that in Example 1 except that materials were blended in each proportion listed in Table 1.

Comparative Examples 1 to 9

A foam was prepared in the same method as that in Example 1 except that materials were blended in each proportion listed in Table 1.

The storage modulus of the formation material used in each example and comparative example, and the specific gravity, the elastic coefficient at a strain of 0% (listed as E0 in Table 2), the elastic coefficient at a strain of 40% (listed as E40 in Table 2), and the Asker C hardness (listed as H0 in Table 2) of the foam prepared in each example are measured, according to the following measurement methods. The result is listed in Table 2. E40/E0 in Table 2 is a value obtained by dividing the measured E40 and E0.

[Method of Measuring Specific Gravity]

The specific gravity of the foam was measured at 23° C., using an electronic densimeter (manufactured by Alfa Mirage Co., Ltd., trade name "MD-3005"), in accordance with JIS K 7311.

[Method of Measuring Storage Modulus]

The formation materials of the foam of each example except for a foaming agent (namely, a resin component, a mineral oil, a processing aid, a foaming auxiliary and a crosslinking agent) were mixed with the ratios listed in Table 1. These materials were kneaded using a pressurizing kneader and a mixing roller, and press-formed for 30 minutes while heating to 150° C. to 180° C., to prepare a resin sheet with a thickness of about 2 mm. This resin sheet was cut into the following sample shape. The storage modulus of the resin sheet was calculated by measuring dynamic viscoelasticity in the following conditions, in accordance with JIS K 7244-4. It is considered that the above resin sheet has physical properties equivalent to the bubble wall of the foam, thus the storage modulus of the resin sheet was adopted as the storage modulus of the formation materials of the foam.

Measuring device: Dynamic viscoelasticity measuring device Rheogel-E4000, manufactured by UBM Co., Ltd.
Sample shape: Strip-shape of 33±3 mm in length, 5±0.3 mm in width, and 2±0.3 mm in thickness
Measurement mode: Tensile mode of sine wave distortion
Distance between chucks: 20±0.2 mm
Temperature: 23° C.
Frequency: 10 Hz
Load: Automatic static load
Dynamic strain: 3 to 5 µm

[Method of Measuring E0 and E40]

After obtaining the stress-strain curve of the foam, the elastic coefficient at a strain of 0% (E0) and the elastic coefficient at a strain of 40% (E40) of the foam were obtained from the inclination of a tangent at a point corresponding to a strain of 0% of the curve and the inclination of a tangent at a point corresponding to a strain of 40% of the curve. E40/E0 was calculated by dividing E40 by E0, and rounded off to three decimal places.

The stress-strain curve was obtained by cutting the foam into a columnar shape of 10 mm in diameter×10 mm in height to obtain a sample piece, and compressing the sample piece at a strain rate of 0.01 mm/second at 23° C., using an autograph precision universal tester (manufactured by SHIMADZU CORPORATION, trade name "AG-50kNIS MS model").

[Method of Measuring Asker C Hardness]

The Asker C hardness of the foam was measured at 23° C., using a type C hardness tester (Kobunshi Keiki Co., Ltd., trade name "ASKER Rubber Hardness Tester Type C"), in accordance with JIS K 7312. Here, as the measurement sample, a rectangular parallelepiped foam was used as it was (without cutting the foam). The measurement of the Asker C hardness was the measurement of hardness of the foam at no load, and the measured value was H0 in Table 2.

TABLE 2

| | Specific Gravity | Storage Modulus | E0 | E40 | E40/E0 | H0 | H1 | H1 − H0 |
|---|---|---|---|---|---|---|---|---|
| Example 1 | 0.77 | 12.9 | 5.48 | 12.04 | 2.197 | 81 | 82 | 1 |
| Example 2 | 0.37 | 12.9 | 2.32 | 1.45 | 0.625 | 59 | 55 | −4 |
| Example 3 | 0.12 | 12.9 | 0.73 | 0.37 | 0.507 | 27 | 10 | −17 |
| Example 4 | 0.10 | 12.9 | 0.52 | 0.29 | 0.558 | 17 | 19 | 2 |
| Example 5 | 0.64 | 7.7 | 1.97 | 5.24 | 2.660 | 66 | 68 | 2 |
| Example 6 | 0.32 | 7.7 | 0.79 | 0.72 | 0.911 | 39 | 20 | −19 |
| Example 7 | 0.21 | 7.7 | 0.46 | 0.45 | 0.978 | 28 | 16 | −12 |
| Example 8 | 0.12 | 7.7 | 0.30 | 0.24 | 0.800 | 14 | 19 | 5 |
| Example 9 | 0.61 | 1.3 | 0.57 | 1.29 | 2.263 | 40 | 45 | 5 |
| Example 10 | 0.37 | 1.3 | 0.34 | 0.57 | 1.676 | 27 | 34 | 7 |
| Example 11 | 0.63 | 0.6 | 0.32 | 0.78 | 2.438 | 28 | 34 | 6 |
| Example 12 | 0.36 | 0.6 | 0.17 | 0.32 | 1.882 | 20 | 34 | 14 |
| Example 13 | 0.37 | 17.5 | 3.17 | 1.70 | 0.536 | 68 | 66 | −2 |
| Example 14 | 0.40 | 9.9 | 2.31 | 1.36 | 0.589 | 64 | 64 | 0 |
| Example 15 | 0.27 | 9.9 | 1.08 | 0.64 | 0.593 | 48 | 38 | −10 |
| Example 16 | 0.15 | 9.9 | 0.43 | 0.37 | 0.860 | 26 | 18 | −8 |
| Example 17 | 0.36 | 5.8 | 1.37 | 0.88 | 0.642 | 50 | 46 | −4 |
| Example 18 | 0.25 | 5.8 | 0.63 | 0.47 | 0.746 | 37 | 18 | −19 |
| Example 19 | 0.16 | 5.8 | 0.33 | 0.26 | 0.788 | 20 | 25 | 5 |
| Comparative Example 1 | 0.19 | 55.7 | 4.59 | 0.69 | 0.150 | 55 | 25 | −30 |
| Comparative Example 2 | 0.12 | 55.7 | 2.18 | 0.46 | 0.211 | 41 | 6 | −35 |
| Comparative Example 3 | 0.11 | 55.7 | 1.80 | 0.42 | 0.233 | 39 | 11 | −28 |
| Comparative Example 4 | 0.25 | 1.3 | 0.13 | 0.21 | 1.615 | 9 | 36 | 27 |
| Comparative Example 5 | 0.14 | 1.3 | 0.07 | 0.21 | 3.000 | 4 | 44 | 40 |
| Comparative Example 6 | 0.23 | 0.6 | 0.14 | 0.27 | 1.929 | 8 | 37 | 29 |
| Comparative Example 7 | 0.15 | 0.6 | 0.04 | 0.14 | 3.500 | 0 | 38 | 38 |
| Comparative Example 8 | 0.19 | 17.5 | 1.55 | 0.68 | 0.439 | 48 | 23 | −25 |
| Comparative Example 9 | 0.12 | 17.5 | 0.96 | 0.39 | 0.406 | 35 | 3 | −32 |

[Hardness Test]

Generally, wearing comfort of shoes can be indicated by the hardness in which a wearer feels on the sole during wearing.

A general adult male (with a weight of 60 kg) and a child (with a weight of 20 kg) are assumed as wearers of shoes, and a case where the weight of those wearers is applied to a sole of shoes is considered. When the general adult male stands at rest, the maximum compressive stress applied to the sole is about 0.1 MPa (about 1 kgf/cm$^2$) from the value obtained by dividing a weight by an area of the heel. On the other hand, the child is light in weight, also the sole (the arch of the foot) is undeveloped, and the ground contact area of the sole is large. Based on these reasons, when the child stands at rest, the maximum compressive stress applied to the sole of the shoes is much smaller than that of the general adult male (about 1/10 of an adult male).

In view of the above, when an adult male wears the shoes, a load of 0.1 MPa is assumed to be applied to the sole, and when a child wears the shoes, a load is assumed not to be substantially applied to the sole. Moreover, in order to verify wearing comfort of shoes in which different wearers (adult male and child) feel, the following hardness test was performed.

Assuming a case where the adult male wore the shoes, a load of 0.1 MPa was applied to the foam (assumed as the sole of shoes) prepared in each example and comparative example described above, and the hardness was measured.

Specifically, the foam was cut into the same area (height of 10 mm) as a pressurizing surface of a type C hardness tester to obtain a sample piece. The pressurizing surface of a model C hardness tester (Kobunshi Keiki Co., Ltd., trade name "ASKER Rubber Hardness Tester Type C") was put on this sample piece, and a load of 0.1 MPa (about 1 kgf/cm$^2$) was applied over the entire sample piece, and this sample piece was compressed. The Asker C hardness of the sample piece in compression was measured at 23° C., using the type C hardness tester.

The result is listed in Table 2. Here, H1 in Table 2 shows the Asker C hardness in compression.

As described above, when the child wears the shoes, a load is assumed not to be substantially applied to the sole. Therefore, the hardness of the foam assumed when the child wears the shoes corresponds to the Asker C hardness of the foam in a no load state. The Asker C hardness of the foam in a no load state is H0 in Table 2.

The smaller the difference between the hardness (H1) during compression and the hardness (H0) in uncompression of each foam, the smaller the change in hardness (i.e., change in softness).

The value of H1−H0 is listed in Table 2.

[Evaluation]

When H1−H0 was within the range of ±20 degrees, wearing impression was judged as comfortable. Namely, when the difference between the hardness (H1) when assuming that a person with a weight of 60 kg gets on and the hardness (H0) when assuming that a person with a weight of 20 kg gets on (H1−H0) is within ±20 degrees, it is not a large change in hardness. When the foam described above is used in a sole of a shoe, it can be said that a large difference in wearing impression of each wearer is not generated.

The foams of Examples 1 to 19 have H1−H0 within the range of ±20 degrees, and in these foams, a large change in hardness was not generated by difference in loads.

Here, for example, even when assuming a person with a weight of 30 kg or 40 kg, the foams of Examples 1 to 19 can be estimated not to generate a large change in hardness as well.

In the foams of Examples 1, 5 and 13, a large change in hardness was not generated by difference in loads. However, the foams of these Examples has an Asker C hardness exceeding 60 degrees both at no load and at load. When used as a sole of a shoe, it is preferred that the Asker C hardness at no load is within the range of 10 degrees to 60 degrees, as the foams of Examples 2 to 4, 6 to 12 and 14 to 19.

On the other hand, the foams of Comparative Examples 1 to 9 have H1−H0 outside the range of ±20 degrees, and in these foams, a large change in hardness was generated by difference in loads.

Comparative Examples 1 to 3, 8 and 9 have a E40/E0 of less than 0.5, and a large change in hardness was generated.

While Comparative Examples 4 to 7 have a E40/E0 of 0.5 or more, H0 was less than 10, thus a large change in hardness was generated. It is estimated to be caused by that, in a foam having H0 (Asker C hardness at no load) of less than 10, the cells in the foam deform when a load is applied, whereby the foam becomes hard.

Here, while data is not obtained for a foam having a E40/E0 of less than 0.5 and H0 of less than 10, it is estimated such foam provides the same results as the foams of Comparative Examples 1 to 9.

Here, the present inventors also obtained measured values of the elastic coefficient at a strain of 20% (E20), the elastic coefficient at a strain of 30% (E30) and the elastic coefficient at a strain of 50% (E50), at the same time as the measurement of E0 and E40 of each example and comparative example.

Then, in a case where E20/E0 is 0.2 or more, E30/E0 is 0.3 or more and E50/E0 is 0.8 or more, the difference between the hardness (H1) when assuming that a person with a weight of 60 kg gets on and the hardness (H0) when assuming that a person with a weight of 20 kg gets on (H1−H0) was within ±20 degrees.

It can be also seen from the above that there is a prescribed correlation between the ratio of the elastic coefficients in each strain amount and wearing impression of the shoes.

Among the ratios of those elastic coefficients, the present inventors adopted the ratio of elastic coefficients (E40/E0) using "strain of 40%" that is a strain amount generated in the sole when a general adult male actually uses shoes.

INDUSTRIAL APPLICABILITY

A molded foam article according to the present invention can be used as constituting members of a shoe and constituting members of sporting goods, for example.

1a, 1b Shoe
2a, 2b Shoe body
3a, 3b Midsole
5a, 51b, 52b Outer sole

What is claimed is:

1. A molded foam article comprising:
   a foam obtained by foaming a formation material, wherein the formation material of the foam comprises (i) at least one resin component selected from a thermoplastic elastomer, a thermoplastic resin, and a rubber, and (ii) at least one softener selected from a vegetable oil and a mineral oil,
   wherein an Asker C hardness of the foam is 10 degrees or more,
   wherein the at least one resin component and the at least one softener are selected such that a ratio E40/E0 of the foam is (i) equal to or more than 0.5 and (ii) equal to or less than 3.5, the ratio E40/E0 being a ratio of an elastic coefficient E40 at a compressive strain of 40% in relation to an elastic coefficient E0 at a compressive strain of 0% of the foam, and
   wherein a difference between (i) H1 as an Asker C hardness when a load of 0.1 MPa is applied and (ii) H0 as an Asker C hardness in a no load state, is within a range of ±20 degrees.

2. The molded foam article according to claim 1, wherein the Asker C hardness of the foam is 60 degrees or less.

3. The molded foam article according to claim 1, wherein a storage modulus of the formation material is 15 MPa or less at a frequency of 10 Hz at 23° C.

4. The molded foam article according to claim 1, wherein the foam has a specific gravity of 0.7 or less.

5. A foamed sole having the molded foam article as defined in claim 1.

6. A shoe having the foamed sole as defined in claim 5.

7. The molded foam article according to claim 1, wherein the thermoplastic elastomer includes a styrene-based elastomer.

8. The molded foam article according to claim 1, wherein the thermoplastic resin includes a vinyl acetate-based resin.

9. The molded foam article according to claim 1, wherein the resin component comprises rubber.

* * * * *